United States Patent
Vigilant (10) Patent No.: US 10,277,393 B2
(45) Date of Patent: Apr. 30, 2019

(54) SYSTEM AND METHOD FOR ONE-TIME CHINESE-REMAINDER-THEOREM EXPONENTIATION FOR CRYPTOGRAPHIC ALGORYTHMS

(71) Applicant: GEMALTO SA, Meudon (FR)

(72) Inventor: David Vigilant, Meudon (FR)

(73) Assignee: GEMALTO SA, Meudon (FR)

( * ) Notice: Subject to any disclaimer, the term of this patent is extended or adjusted under 35 U.S.C. 154(b) by 21 days.

(21) Appl. No.: 15/509,310

(22) PCT Filed: Aug. 31, 2015

(86) PCT No.: PCT/EP2015/069867
§ 371 (c)(1),
(2) Date: Mar. 7, 2017

(87) PCT Pub. No.: WO2016/037885
PCT Pub. Date: Mar. 17, 2016

(65) Prior Publication Data
US 2017/0257211 A1   Sep. 7, 2017

(30) Foreign Application Priority Data
Sep. 10, 2014  (EP) ..................................... 14306393

(51) Int. Cl.
*H04L 9/00*  (2006.01)
*G06F 7/72*  (2006.01)
(Continued)

(52) U.S. Cl.
CPC .............. *H04L 9/004* (2013.01); *G06F 7/556* (2013.01); *G06F 7/723* (2013.01); *H04L 9/003* (2013.01);
(Continued)

(58) Field of Classification Search
CPC ...... H04L 9/003–9/005; H04L 2209/04; H04L 2209/046; G06F 7/556; G06F 7/723
See application file for complete search history.

(56) References Cited

U.S. PATENT DOCUMENTS

2013/0208886 A1*  8/2013  Lee ........................... H04L 9/28
                                                                     380/28

FOREIGN PATENT DOCUMENTS

EP    2605444 A1 *  6/2013  ............ H04L 9/003
EP    2738973 A1     6/2014

OTHER PUBLICATIONS

PCT/EP2015/069867 International Search Report, dated Oct. 26, 2015, European Patent Office, P.B. 5818 Patentlaan 2 NL—2280 HV Rijswijk.

(Continued)

*Primary Examiner* — Minh Dinh
(74) *Attorney, Agent, or Firm* — The Jansson Firm; Pehr B. Jansson (57) ABSTRACT

A system, method and computer-readable storage medium with instructions for protecting an electronic device against fault attack. The technology includes operating the electronic device to determine two half-size exponents, dp and dq, from the exponent d; to split the base m into two sub-bases mp and mq determined from the base m; and to iteratively compute a decryption result S by repeatedly multiplying an accumulator A by m, mp, mq or 1 depending on the values of the i-th bit of dp and dq for each iteration I'. Other systems and methods are disclosed.

16 Claims, 6 Drawing Sheets (51) Int. Cl.
    *G06F 7/556*     (2006.01)
    *H04L 9/30*     (2006.01)

(52) U.S. Cl.
    CPC ...... *H04L 9/302* (2013.01); *G06F 2207/7261* (2013.01)

(56) References Cited

OTHER PUBLICATIONS

PCT/EP2015/069867 Written Opinion of the International Searching Authority, dated Oct. 26, 2015, European Patent Office, D-80298 Munich.
Giraud C: "An RSA Implementation Resistant to Fault Attacks and to Simple Power Analysis", IEEE Transactions on Computers, IEEE Service Center, Los Alamitos, CA, US, vol. 55, No. 9, (Sep. 1, 2006), pp. 1116-1120, XP002460785, ISSN: 0018-9340, DOI: 10.1109/TC.2006.135 cited in the application the whole document.

\* cited by examiner

SYSTEM AND METHOD FOR ONE-TIME CHINESE-REMAINDER-THEOREM EXPONENTIATION FOR CRYPTOGRAPHIC ALGORYTHMS

BACKGROUND OF THE INVENTION

The present invention relates generally to electronic cryptography technology, and in particular to protecting a security device against side-channel attacks by using multiplicative masking using simultaneous exponentiation techniques.

Electronic communication and commerce can be powerful yet dangerous tools. With the wide-spread availability of network technology, such as the Internet, there is an ever increasing use of online tools for communication and commerce. Every year more users find it easier or quicker to conduct important transactions, whether in the form of correspondence or commerce, using computers and computer networks. However, there is always the risk that the security of electronic transactions is compromised through interception by third parties who do not have the right to partake in the transactions. When malicious third parties obtain access to otherwise private transactions and data there is risk of economic loss, privacy loss, and even loss of physical safety. Cryptography is one mechanism employed to avoid intrusion into the privacy of electronic transactions and data.

Cryptography is a technology for hiding a message in the presence of third parties using mathematical techniques in which a message is encrypted in such a way that it can only be decrypted using a secret key that should only be known by the recipient and/or sender of a message.

Cryptographic algorithms have inputs and outputs. In the case of encryption, the input is a message that is to be protected in plaintext. The plaintext message is manipulated by the cryptographic algorithm to produce a ciphertext, the output. To produce the ciphertext the cryptographic algorithm performs certain mathematical operations that include the use of a secret key. The key may be a shared secret, e.g., between a sender and recipient, or may be a private key held by the recipient.

One frequently used cryptographic technique is the RSA algorithm named for its inventors Rivest, Shamir, and Adelman. To obtain a highly secure ciphertext, the RSA algorithm relies on the difficulty of factoring large integers. A user creates a public key by randomly selecting two large similar-sized prime numbers and multiplies these two numbers together. The result is the public key of the user which the user may publish thereby enabling other entities to encrypt messages for the user. While the public key is public and anyone can encrypt a message with its use, the encrypted message can only be decrypted using the corresponding private key which, in effect, consists of the two prime numbers that were used to generate the public key. It is therefore critical to the security provided by the RSA algorithm that the private keys are kept secret and cannot be discerned by a third party attempting to subvert the secrecy of RSA-encrypted messages.

While the details of the RSA algorithm are beyond this document, for discussion purposes herein the algorithm may be reduced to two complimentary calculations for encryption of a message M into a ciphertext C and the decryption of the ciphertext C back into the message M. The public key is computed from two large prime numbers p and q. From p and q a number n=pq is computed; n is the modulus for both private and public keys. Furthermore e, the public key exponent is computed from p and q, as follows:

Choose e such that: $1<e<\varphi(n)$ and the greatest common divisor of $(e, \varphi(n))=1$, i.e., e and $\varphi(n)$ are coprime, wherein, n=pq and $\varphi(n)$ is Euler's Totient function.

Thus, the public key consists of the pair of integers (n, e). The corresponding private key consists of the pair of integers (n, d) where $d \equiv e^{-1} \pmod{\varphi(n)}$ where $\varphi(n)$ is Euler's Totient function.

A message M is encrypted using the public key (n, e) into ciphertext C by:

$$C = M^e \bmod n$$

The message M is recovered and decrypted from C using the corresponding private key (n,d) by:

$$M = C^d \pmod{n}$$

RSA may also be used to cryptographically sign a message M into a signed message S, i.e., $$S = M^d \pmod{n}$$

Usually these computations are not performed directly as the exponentiations on large integers are expensive computations. A more efficient computation, which involves exponentiation of much smaller integers, uses the Chinese Remainder Theorem. Without going into details, the Chinese Remainder Theorem approach includes the modular exponentiations:

$$Sp = M_p^{dp} \bmod p$$

$$Sq = M_q^{dq} \bmod q$$

Wherein dp=d mod (p−1) and dq=d mod (q−1), and $M_p$=M mod p and $M_q$=M mod q

The RSA-CRT signature computation is composed of 3 main steps:

Computing Sp (about 45% of the computation)
Computing Sq (about 45% of the computation)
Recombining S from Sp and Sq (about 10% of the computation)

Side-channel attacks make use of the program timing, power consumption and/or the electronic emanation of a device that performs a cryptographic computation. The behavior of the device (timing, power consumption and electronic emanation) varies and depends directly on the program and on the data manipulated in the cryptographic algorithm. An attacker could take advantage of these variations to infer sensitive data leading to the recovery of a private key.

Fault attacks derive their name from the practice of creating a fault during the computation and exploiting the result produced by that fault to deduce the secret key. Generally, injecting a fault requires a prior step that consists of determining the most likely successful moment for the fault injection. This prior step is usually done by reverse engineering the program through studying the power or the electronic emanation trace. RSA-CRT is particularly vulnerable to fault attacks because disturbing either the computation of Sp only or Sq only can allow the intruder to deduce the private key, whichever fault effect is caused. Moreover, the set up for inducing a fault during either Sp or Sq computation is relatively easy to do because these two sensitive steps are usually easily identifiable on a power trace. Since Sp and Sq occupy a large portion of the process, roughly 45% each of the total signature, there is ample time to disturb either computation. Thus, a fault disturbing the computation of either Sp or Sq could allow the unauthorized recovery of the private key prime factors.

One mechanism used to defend against fault attacks is to perform the signature operation twice to ensure that no fault has been introduced during the computation. Doing such operations twice would be a costly countermeasure.

Other prior art techniques include Shamir (Shamir, U.S. Pat. No. 5,991,414, Method and apparatus for protecting public key schemes from timing and fault attacks), Aumuller (Aumuller et al, *Concrete results and practical countermeasures*, Cryptographic Hardware and Embedded Systems——CHES 2002: 4th International Workshop, Volume 4), Giraud (Giraud, C., *An RSA implementation resistant to fault attacks and to simple power analysis*, IEEE Transactions on Computers (Volume: 55, Issue: 9), September 2006), and Vigilant (Cryptographic Hardware and Embedded Systems—CHES 2008, Lecture Notes in Computer Science Volume 5154, 2008, pp 130-145).

These prior art techniques may be divided in two types:

The Shamir technique, from which the Aumuller and Vigilant techniques are derived, consists of multiplying the modulus by a small random number before the exponentiation. The exponentiation is performed modulo this new number and some consistency checks can be performed modulo the small random number after the exponentiation. A global consistency check is performed after the recombination. If the global consistency check fails, a fault attack may have been detected.

Giraud's technique consists of using the Montgomery ladder exponentiation algorithm that outputs ($X^{(y-1)}$ mod Z, $X^y$ mod Z) when computing $X^y$ mod Z.

Common to these prior techniques is that they all detect the fault with some probability, except Giraud's one. But Giraud's technique has the drawback to require a large amount of RAM memory for its implementation. Moreover these techniques keep a three-step structure: computation of Sp, computation of Sq, and recombination. Having three steps provides an attacker multiple opportunities to set up a fault attack.

From the foregoing it will be apparent that there is still a need for an improved technology to provide a secure mechanism that is computationally efficient, that does not require excessively large registers or other storage, and in which a portable security device—e.g., a smart card connected to a host computer—can provide the capability of providing cryptographic services that are protected from fault attacks.

DETAILED DESCRIPTION OF THE INVENTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In an embodiment of the invention, a technology is provided that enables the use of smart cards, or other portable security devices, to be used to digitally sign documents or to decrypt encrypted documents or messages using private keys stored on the smart cards in a manner that efficiently reduces the risk of differential power analysis attacks.

Smart cards are plastic cards with an embedded microprocessor and a secure storage. They are portable, secure, and tamper-resistant. Smart cards provide security services in many domains including telecommunication, banking, commerce, and citizen identity. Smart cards can take different forms, such as credit card shaped cards with electrical connectors to connect the smart card to a smart card reader, USB tokens with embedded smart cards, and SIM cards for use in mobile telephones and tablet devices. Smart cards are used herein as examples of portable security devices that may be used in implementations of the technology described herein. Other examples of portable security devices include smart memory cards, flash memory, etc. In a preferred embodiment, the portable security device has a processor, a memory for storing programs and data, and some security features to make the device relatively tamper-proof. Smart cards are used herein as examples of such devices.

While the mechanism for masking a cryptographic calculation described herein may be used advantageously in smart cards and other portable security tokens used for performing cryptographic calculations, the same mechanisms may also be used with other cryptographic processors. Thus, smart cards are used herein for illustrative purposes only.

Digital signature and other cryptography are examples of functions that smart cards provide. The smart card stores private or shared secret keys in its secure storage and performs cryptographic operations to generate a digital signature for a given input or to decrypt a given input. A smart card works with a host device, such as a personal computer (PC), cell phone, tablet device or banking terminal. A PC application, such as an email client or a web browser, typically works with a smart card to sign, encrypt, or decrypt a document. The cryptographic operation may be part of a challenge-response mechanism for user authentication. The PC application and the smart card interact through some cryptographic API called middleware, which is designed to communicate with the smart card. In this scenario, the smart card provides services locally to the PC.

Figure 1:
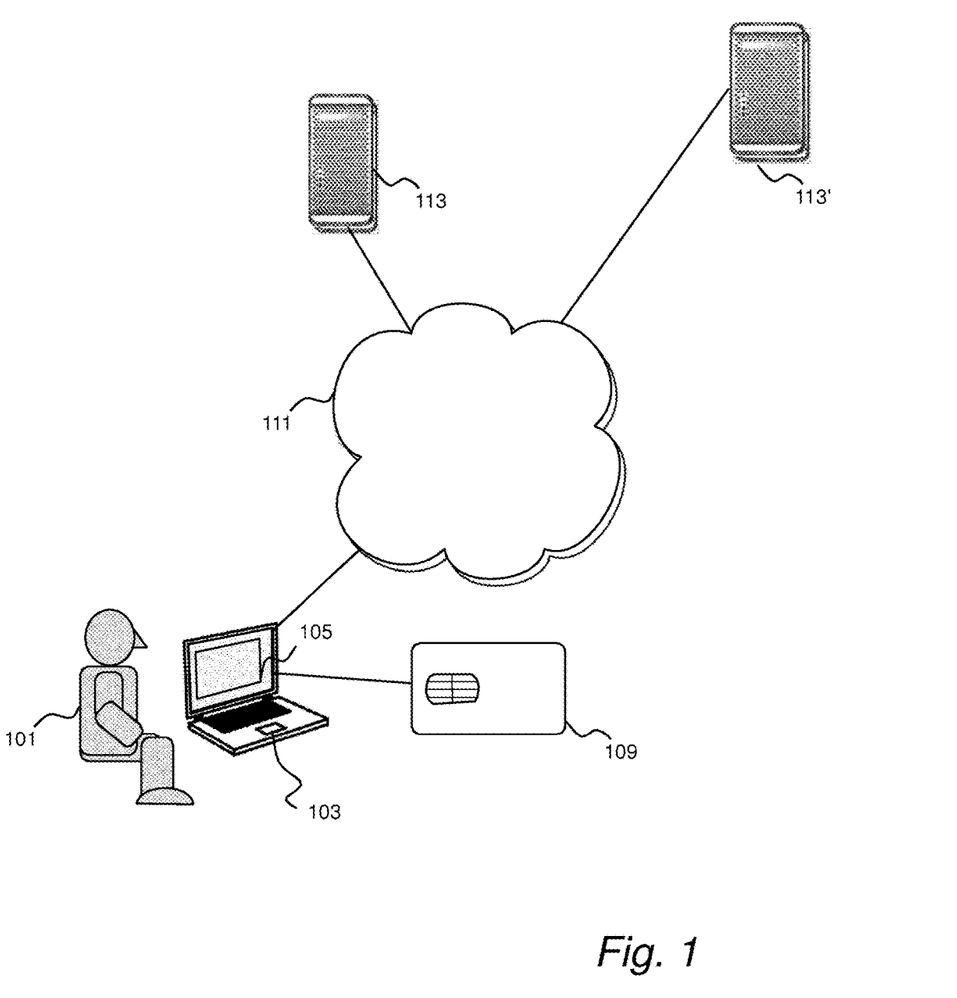
FIG. 1 is a schematic illustration of a host computer with a portable security device, e.g., a smart card, connected thereto for performing cryptographic services through connection over a network to one or more servers.

FIG. 1 is a schematic illustration of a network 111 connecting a host computer 103 with a portable security device 109, e.g., a smart card, connected thereto, to one or more remote servers 113. The host computer 103 is operated by a user 101 who interacts with one of the servers 113 via a web browser window 105 of a web browser. In the example scenario illustrated in FIG. 1, the smart card 109 provides the cryptographic operations on behalf of the user 101, e.g., to cryptographically sign documents, to decrypt messages received from the relying party 113, or to perform a cryptographic operation as part of a challenge-response authentication mechanism.

While FIG. 1 provides an illustration of a scenario in which cryptography may play an important role, there are many other important uses for cryptography. Thus, the technology described herein is not limited in its application to the example of use which is illustrated in FIG. 1.

Figure 2:
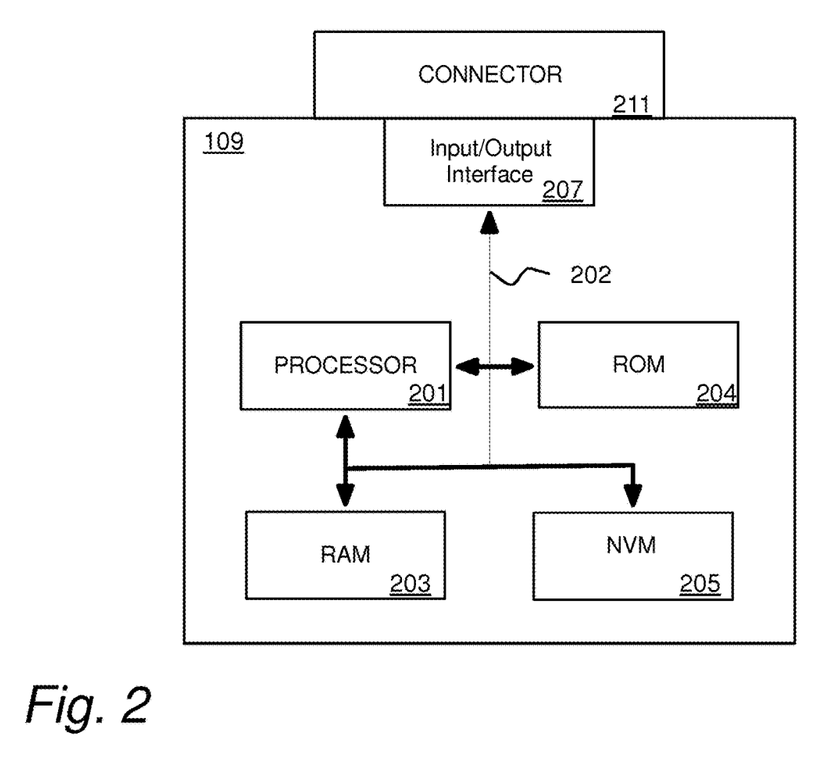
FIG. 2 is a schematic illustration of a portable security device.

FIG. 2 is a schematic illustration of a portable security device 109, for example, a smart card. The portable security device 109 may include a processor 201 connected via a bus 202 to a random access memory (RAM) 203, a read-only memory (ROM) 204, and a non-volatile memory (NVM) 205. The portable security device 109 further includes an input/output interface 207 for connecting the processor 201, again typically via the bus 202, to a connector 211 by which the portable security device 109 may be connected to the host computer 103.

In alternative embodiments, the connection between the host computer 103 and the portable security device 109 is wireless, for example, using near-field communication (NFC) or other radio or microwave communication technologies.

Figure 3:
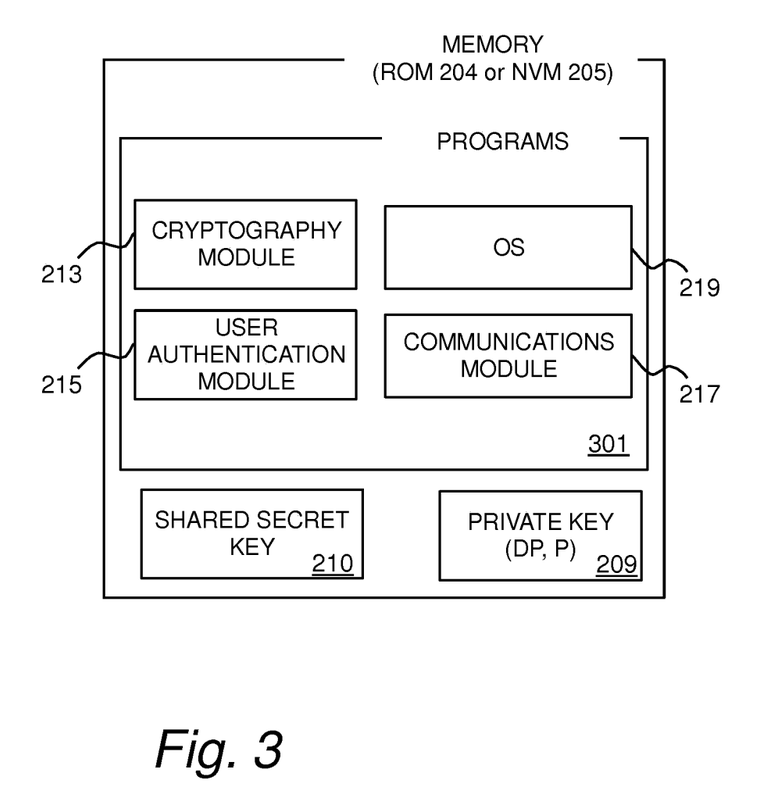
FIG. 3 is a schematic illustration of programs stored in a memory of the portable security device of FIG. 2.

The NVM 205 and/or ROM 204 may include computer programs 301 as is illustrated in FIG. 3. While it is here depicted that the computer programs 301 are all co-located in the ROM 204 or the NVM 205, in actual practice there is no such restriction as programs may be spread out over multiple memories and even temporarily installed in RAM 203. Furthermore, the portable security device 109 may include multiple ROMs or NVMs. The programs 301 include operating system programs as well as application programs loaded onto the portable security device 109. The NVM 205 or ROM 204 may also contain private data, such as a private key 209 or a shared secret key 210, stored either in its basic form or in derived quantities.

The portable security device 109 programs 301 may include a cryptography module 213, a user authentication module 215, a communications module 217, and the operating system OS 219.

Thus, the portable security device 109 may receive a document or message via the connector 211. The processor 201, by executing instructions of the cryptography module 213, may digitally sign the document/message or may decrypt the document/message using the private key 209 or shared secret key 210. Using functionality provided through the communications module 217, the processor 201 may receive and transmit communications with the host computer 103.

Figure 4:
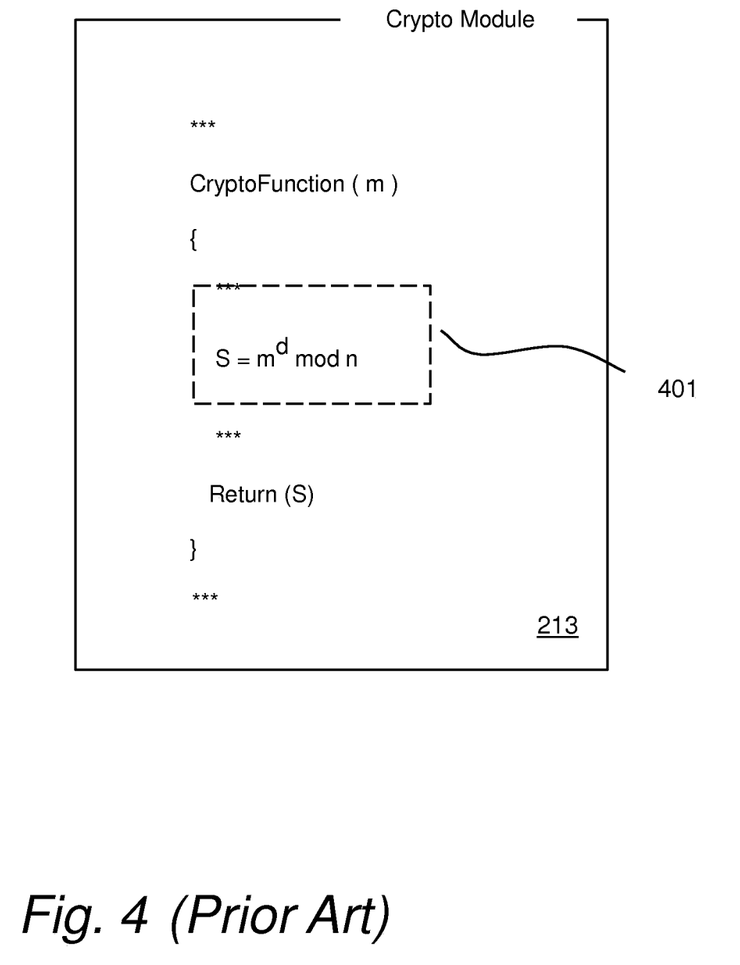
FIG. 4 is a schematic illustration of a prior art cryptography module program listing that may be stored in the memory of a portable security device as illustrated in FIG. 3 and which performs a decryption including exponentiation operations.

FIG. 4 is a schematic of a prior art possible implementation of the cryptography module 213. The cryptography module 213 would contain one or more functions, methods, or routines. One possible function could be, as is illustrated in FIG. 4, a function called CryptoFunction( ) which takes the argument M, the message to sign or decrypt. In the cryptography module 213 the signature S is computed using the standard RSA equation 401, namely, $S=m^D$ mod n.

An alternative prior art approach implements the CryptoFunction ( ) using the Chinese Remainder Theorem to perform a cryptographic operation; it includes modular exponentiation calculations 401 on half-size elements.

Figure 5:
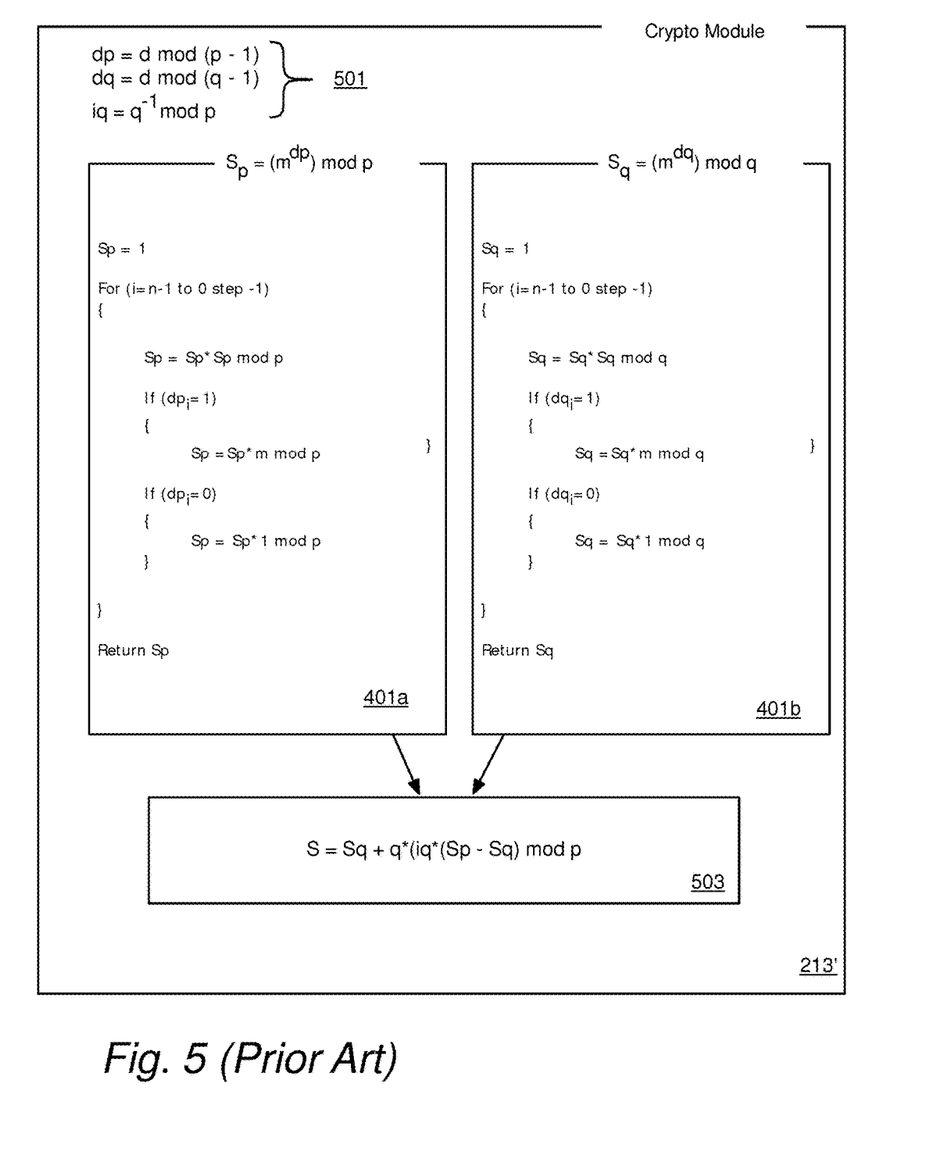
FIG. 5 illustrates a prior art method for performing a decryption operation using modular exponentiation according to the square-and-multiply-always algorithm with half-size elements to perform two exponentiation operations, namely, $S_p=(M^{dp})$ mod p and $S_q=(M^{dq})$ mod q.

As a person skilled in the art would appreciate, this operation would be reduced to lower level arithmetic statements for the sake of efficiency. A common approach for efficiently calculating $M^{dp}$ mod p is the Square-and-MultiplyAlways algorithm. FIG. 5 is a program listing for a crypto module 213' illustrating a traditional square-and-multiply-always procedure for calculating $Sp=M^{dq}$ mod p (algorithm 401a) and $Sq=M^{dq}$ mod q (algorithm 401b) using the quantities dp, dq, and iq (step 501) which are defined as:

$$dp=d\ \mathrm{mod}(p-1)$$

$$dq=d\ \mathrm{mod}(q-1)$$

$$iq=q^{-1}\ \mathrm{mod}\ p$$

wherein dp and dq are written in the binary representations $$dp=[dp_{n-1},dp_{n-2},\ldots,dp_2,dp_1,dp_0]$$

and $$dq=[dq_{n-1},dq_{n-2l},\ldots,dq_2,dq_1,dq_0]$$

S may then be computed using Garner's formula, step 503:

$$S=Sq+q^*(iq^*(Sp-Sq)\mathrm{mod}\ p$$

The algorithm of FIG. 5 is much more efficient than the algorithm of FIG. 4 because it uses half-sized elements.

According to an embodiment of the invention described herein below, the crypto module 213' (FIG. 6) uses a modification to the exponentiation algorithms in FIGS. 4 and 5 that, like the algorithm in FIG. 5, uses half-sized exponents while performing only one exponentiation. This modified approach is illustrated in FIG. 5.

Figure 6:
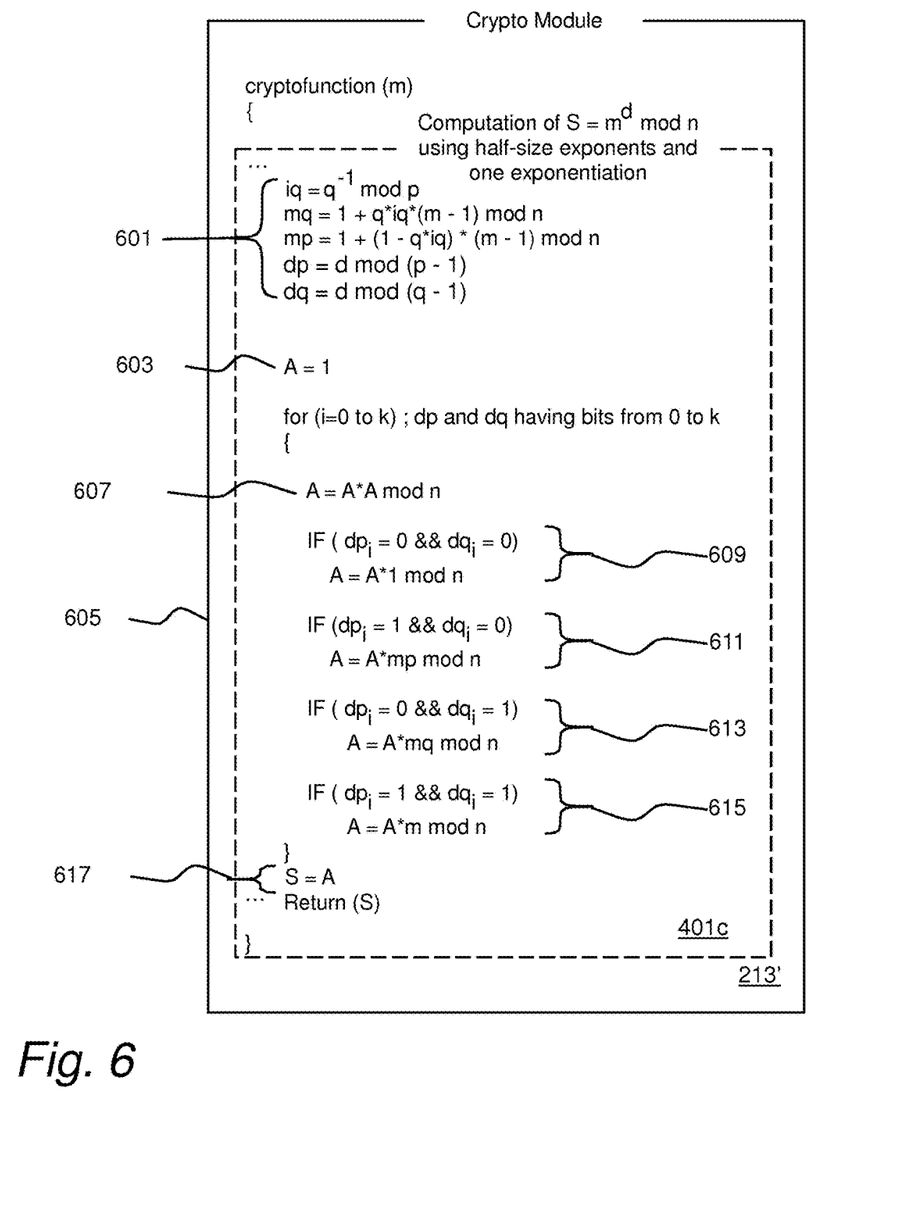
FIG. 6 illustrates a crypto module implementing a modified decryption algorithm using half-size elements, according to a preferred embodiment to perform the decryption using the same key material as in the algorithms of FIGS. 4 and 5 while performing only one exponentiation.

FIG. 6 is a program listing illustrating a modified modular exponentiation calculation 401c to compute the result $S=m^D$ mod n used in a preferred embodiment of a crypto module 213" incorporated, for example, into a memory, e.g., the ROM 204 or NVM 205 of a portable security device 109, using half-sized exponents while performing only one exponentiation. The exponentiation calculation 401c calculates S by an alternative use of the Chinese Remainder Theorem.

The inputs to the algorithm are:

m—the message to be decrypted q and p—the two large prime numbers that are multiplied to compute n The exponentiation calculation 401c begins by performing three preliminary calculations, 601:

$$iq=q^{-1}\ \mathrm{mod}\ p$$

$$mq=1+q^*iq^*(m-1)\mathrm{mod}\ n$$

$$mp=1+(1-q^*iq)^*(m-1)\mathrm{mod}\ n$$

It may be shown through modular arithmetic that from the above calculations, the following relationships hold:

mq mo p=1 mq mod q=m mod q mp mod q=1 mp mod p=m mod p

The calculation also uses the quantities dp and dq, which are defined from quantities p and q, respectively, as is described above, as:

$$dp = d \bmod (p-1)$$

$$dq = d \bmod (q-1)$$

An accumulator value A is initialized to 1, Step 603.

Next, with the binary representation of dp as dp=[$dp_o$, $dp_1$, . . . , $dp_{k-1}$, $dp_k$] and dq=[$dq_o$, $dq_1$, . . . , $dq_{k-1}$, $dq_k$], S is computed iteratively (loop 605) modifying the accumulator A over the bits of dp and dq and depending on the value of each bit $dp_i$ and $dq_i$ performing updates of the value A, as follows:

At the beginning of each iteration, A is set to A=A*A mod n, step 607.

The value pair $dp_i$ and $dq_i$ present four possible mutually exclusive alternatives: $dp_i$=0 and $dq_i$=0, $dp_i$=1 and $dq_i$=0, $dp_i$=0 and $dq_i$=1, and $dp_i$=1 and $dq_i$=1.

For the first of these alternatives ($dp_i$=0 and $dq_i$=0), A is set to A=A*1 mod n, steps 609. As this is an identity operation, in an actual implementation, the step is bypassed by doing nothing as the operation does not change the value of A. [0053] For the second alternative ($dp_i$=1 and $dq_i$=0), A is set to A=A*mp mod n, steps 611.

For the third alternative ($dp_i$=0 and $dq_i$=1), A is set to A=A*mq mod n, steps 613.

For the fourth alternative ($dp_i$=1 and $dq_i$=1), A is set to A=A*m mod n, steps 615.

At the conclusion, after all bits of $dp_i$ and $dq_i$ have been processed by the loop 605, the result held in A holds the value S=$m^D$ mod n and may be returned to the calling routine as the signed message S, Step 617.

At each iteration i of the exponentiation, the accumulator A is equal to $S_i$ such that:

$$S_i \bmod p = m^{(dp0\ dp1\ dp2\ \ldots\ dpi)} \bmod p$$

$$S_i \bmod q = m^{(dq0\ dq1\ dq2\ \ldots\ dqi)} \bmod q$$

These relationships are true because:
- in step 615, when multiplying by m, the multiplication of the accumulator A*m is taken modulo p*q because n is defined as n=pq
- in step 611, when multiplying by mp, the multiplication of accumulator A*mp is equivalent to A*m modulo p because the multiplication is 1 modulo q; consequently there is so no change in A due to q
- in step 613, when multiplying by mq, the multiplication of the accumulator A*mq is equivalent to A*m modulo q because the multiplication is 1 modulo p; consequently there is no change in A due to p
- in step 609, when multiplying by 1, the multiplication of A*1 the multiplication is A*1 modulo p and q; consequently there is no change due to either modulo p nor modulo q Thus, after the final iteration—i.e., where i=k:

$$S_p = S_k \bmod p = m^{dp} \bmod p$$

$$S_q = S_k \bmod q = m^{dq} \bmod q$$

In other words, because $$S_p = S \bmod p$$

$$S_q = S \bmod q$$

it follows that $$S = S_{k\ 32\ A}$$

From the foregoing it is evident that a mechanism is presented herein that computes the signed message S in a highly efficient manner using half-size exponent values without exposing multiple exponentiations to fault attacks thereby protecting against detection of the key material used in the encryption.

The above-described mechanism has been described in the context of the square-and-multiply-always technique. The mechanism is readily adapted to other exponentiation techniques.

Although specific embodiments of the invention have been described and illustrated, the invention is not to be limited to the specific forms or arrangements of parts so described and illustrated. The invention is limited only by the claims.

The invention claimed is:

1. A method for operating a cryptography apparatus to perform a decryption operation having an exponentiation operation X, the method protecting the apparatus from revealing information in regard to the exponentiation operation X when the operation is exposed to a fault attack while being executed on the cryptography apparatus, the method comprising producing a result equivalent to the exponentiation by:
   receiving, on the cryptography apparatus, a message m on which to perform a cryptographic operation equivalent to the exponentiation operation S=$m^d$ mod n;
   determining two half-size exponents dp and dq from the exponent d;
   splitting the base m into two sub-bases mp and mq determined from the base m;
   iteratively computing S by repeatedly multiplying an accumulator A by m, mp, mq or 1 depending on the values of the i-th bit of dp and dq for each iteration i;
   returning as the value S the final value of the accumulator A; and completing the cryptographic operation using the value S obtained from the operation.

2. The method of claim 1 wherein the two half-sized exponents dp and dq are determined from dp=d mod (p−1) and dq=d mod (q−1) where p and q are prime numbers such that n=pq.

3. The method of claim 1 wherein:

$$mp = 1 + q*iq*(m-1) \bmod n;\ \text{and}$$

$$mq = 1 + (1 - q*iq)*(m-1) \bmod n\ \text{wherein}$$

$$iq = q^{-1} \bmod p.$$

4. The method of claim 1 wherein dp and dq have bits indexed from 0 to k and the iteration is an iteration from 0 to k performing the calculations:

$$A = A*A \bmod n$$

IF ($dp_i$=0 && $dq_i$ 0)

$$A = A*1 \bmod n$$

IF ($dp_i$=1 && $dq_i$ 0)

$$A = A*mp \bmod n$$

IF ($dp_i$=0 && $dq_i$ 1)

$$A = A*mq \bmod n$$

IF ($dp_i=1$ && $dq_i$ 1)

$A=A*m$ mod $n$.

5. The method of claim 2 wherein:

$mp=1+q*iq*(m-1)$ mod $n$; and $mq=1+(1-q*iq)*(m-1)$ mod $n$ wherein $iq=q^{-1}$ mod $p$.

6. The method of claim 2 wherein dp and dq have bits indexed from 0 to k and the iteration is an iteration from 0 to k performing the calculations:

$A=A*A$ mod $n$

IF ($dp_i=0$ && $dq_i$ 0)

$A=A*1$ mod $n$

IF ($dp_i=1$ && $dq_i$ 0)

$A=A*mp$ mod $n$

IF ($dp_i=0$ && $dq_i$ 1)

$A=A*mq$ mod $n$

IF ($dp_i=1$ && $dq_i$ 1)

$A=A*m$ mod $n$.

7. The method of claim 3 wherein dp and dq have bits indexed from 0 to k and the iteration is an iteration from 0 to k performing the calculations:

$A=A*A$ mod $n$

IF ($dp_i=0$ && $dq_i$ 0)

$A=A*1$ mod $n$

IF ($dp_i=1$ && $dq_i$ 0)

$A=A*mp$ mod $n$

IF ($dp_i=0$ && $dq_i$ 1)

$A=A*mq$ mod $n$

IF ($dp_i=1$ && $dq_i$ 1)

$A=A*m$ mod $n$.

8. The method of claim 5 wherein dp and dq have bits indexed from 0 to k and the iteration is an iteration from 0 to k performing the calculations:

$A=A*A$ mod $n$

IF ($dp_i=0$ && $dq_i$ 0)

$A=A*1$ mod $n$

IF ($dp_i=1$ && $dq_i$ 0)

$A=A*mp$ mod $n$

IF ($dp_i=0$ && $dq_i$ 1)

$A=A*mq$ mod $n$

IF ($dp_i=1$ && $dq_i$ 1)

$A=A*m$ mod $n$.

9. An electronic device protected from fault attack and comprising:
 a central processing unit, memory, and an instruction storage wherein the instruction storage contains instructions to cause the central processing unit to perform:
  receiving, on by the central processing unit of the electronic device, a message m on which to perform a cryptographic operation equivalent to the exponentiation operation $S=m^d$ mod n;
  determining two half-size exponents dp and dq from the exponent d;
  splitting the base m into two sub-bases mp and mq determined from the base m;
  iteratively computing S by repeatedly multiplying an accumulator A by m, mp, mq or 1 depending on the values of the i-th bit of dp and dq for each iteration i;
  returning as the value S the final value of the accumulator A; and completing the cryptographic operation using the value S obtained from the operation.

10. The electronic device protected from fault attack of claim 9, wherein the two half-sized exponents dp and dq are determined from dp=d mod (p−1) and dq=d mod (q−1) where p and q are prime numbers such that n=pq.

11. The electronic device protected from fault attack of claim 9, wherein:

$mp=1+q*iq*(m-1)$ mod $n$; and $mq=1+(1-q*iq)*(m-1)$ mod $n$ wherein $iq=q^{-1}$ mod $p$.

12. The electronic device protected from fault attack of claim 10, wherein:

$mp=1+q*iq*(m-1)$ mod $n$; and $mq=1+(1-q*iq)*(m-1)$ mod $n$ wherein $iq=q^{-1}$ mod $p$.

13. The electronic device protected from fault attack of claim 9, wherein dp and dq have bits indexed from 0 to k and the iteration is an iteration from 0 to k performing the calculations:

$A=A*A$ mod $n$

IF ($dp_i=0$ && $dq_i$ 0)

$A=A*1$ mod $n$

IF ($dp_i=1$ && $dq_i$ 0)

$A=A*mp$ mod $n$

IF ($dp_i=0$ && $dq_i$ 1)

$A=A*mq$ mod $n$

IF ($dp_i=1$ && $dq_i$ 1)

$A=A*m$ mod $n$.

14. The electronic device protected from fault attack of claim 10, wherein dp and dq have bits indexed from 0 to k and the iteration is an iteration from 0 to k performing the calculations:

$A=A*A$ mod $n$

IF ($dp_i=0$ && $dq_i$ 0)

$A=A*1$ mod $n$

IF ($dp_i=1$ && $dq_i$ 0)

$A=A*mp$ mod $n$

IF ($dp_i=0$ && $dq_i$ 1)

$A=A*mq$ mod $n$

IF ($dp_i=1$ && $dq_i$ 1)

$A=A*m$ mod $n$.

15. The electronic device protected from fault attack of claim 11, wherein dp and dq have bits indexed from 0 to k and the iteration is an iteration from 0 to k performing the calculations:

$A = A * A \bmod n$

IF ($dp_i = 0$ && $dq_i$ 0)

$A = A * 1 \bmod n$

IF ($dp_i = 1$ && $dq_i$ 0)

$A = A * mp \bmod n$

IF ($dp_i = 0$ && $dq_i$ 1)

$A = A * mq \bmod n$

IF ($dp_i = 1$ && $dq_i$ 1)

$A = A * m \bmod n.$

16. The electronic device protected from fault attack of claim 12, wherein dp and dq have bits indexed from 0 to k and the iteration is an iteration from 0 to k performing the calculations:

$A = A * A \bmod n$

IF ($dp_i = 0$ && $dq_i$ 0)

$A = A * 1 \bmod n$

IF ($dp_i = 1$ && $dq_i$ 0)

$A = A * mp \bmod n$

IF ($dp_i = 0$ && $dq_i$ 1)

$A = A * mq \bmod n$

IF ($dp_i = 1$ && $dq_i$ 1)

$A = A * m \bmod n.$

* * * * *